Figure 1:
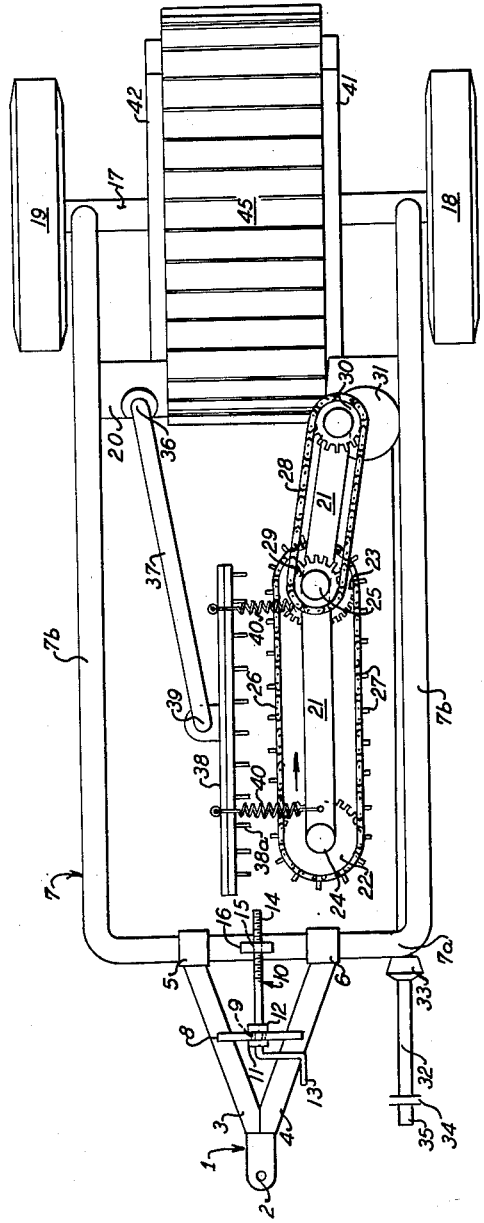

March 7, 1961

C. VAN DER LELY ET AL 2,973,816

BEET HARVESTING MACHINES

Filed Nov. 5, 1956

3 Sheets-Sheet 1

INVENTORS
CORNELIS VAN DER LELY
ARY VAN DER LELY

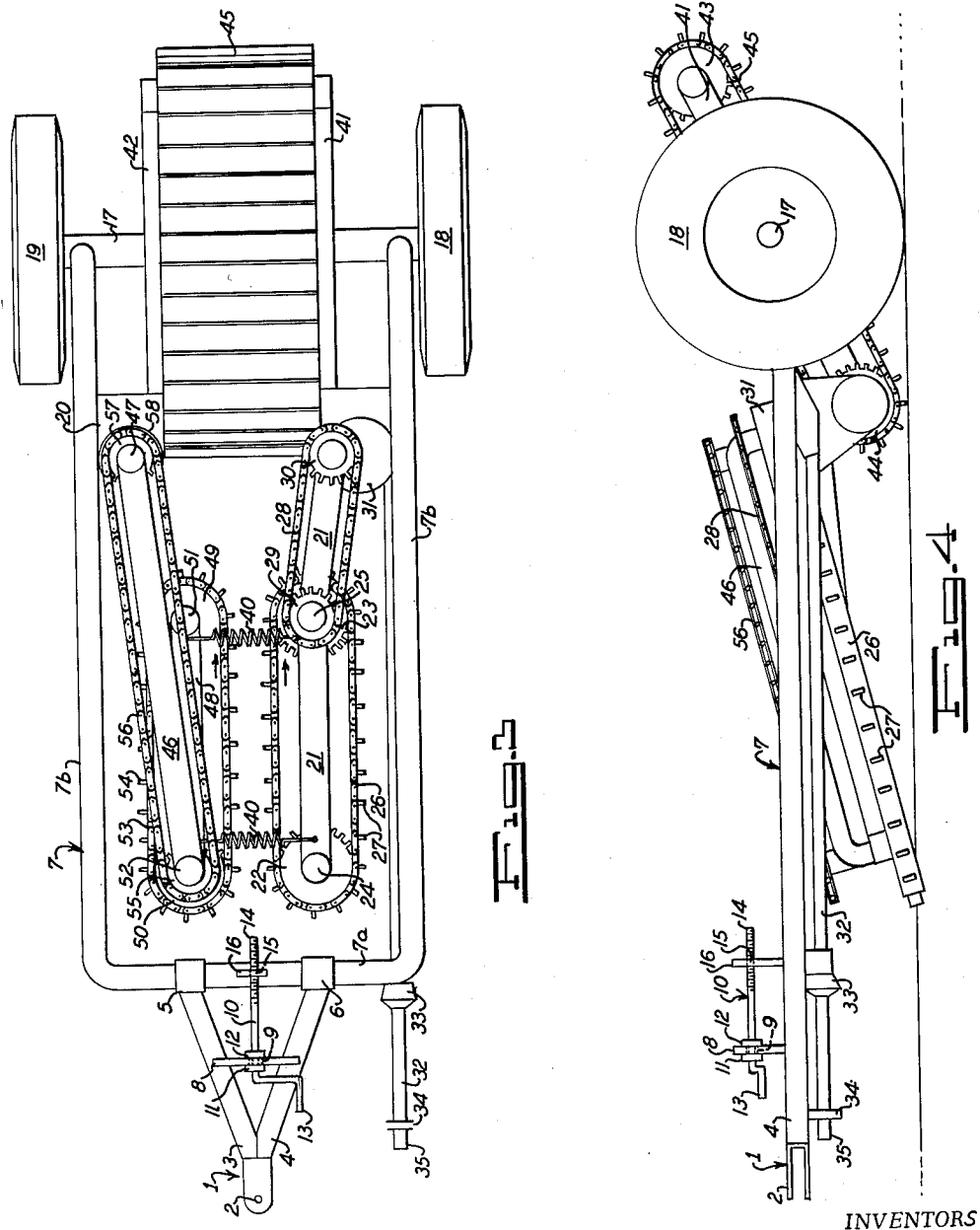

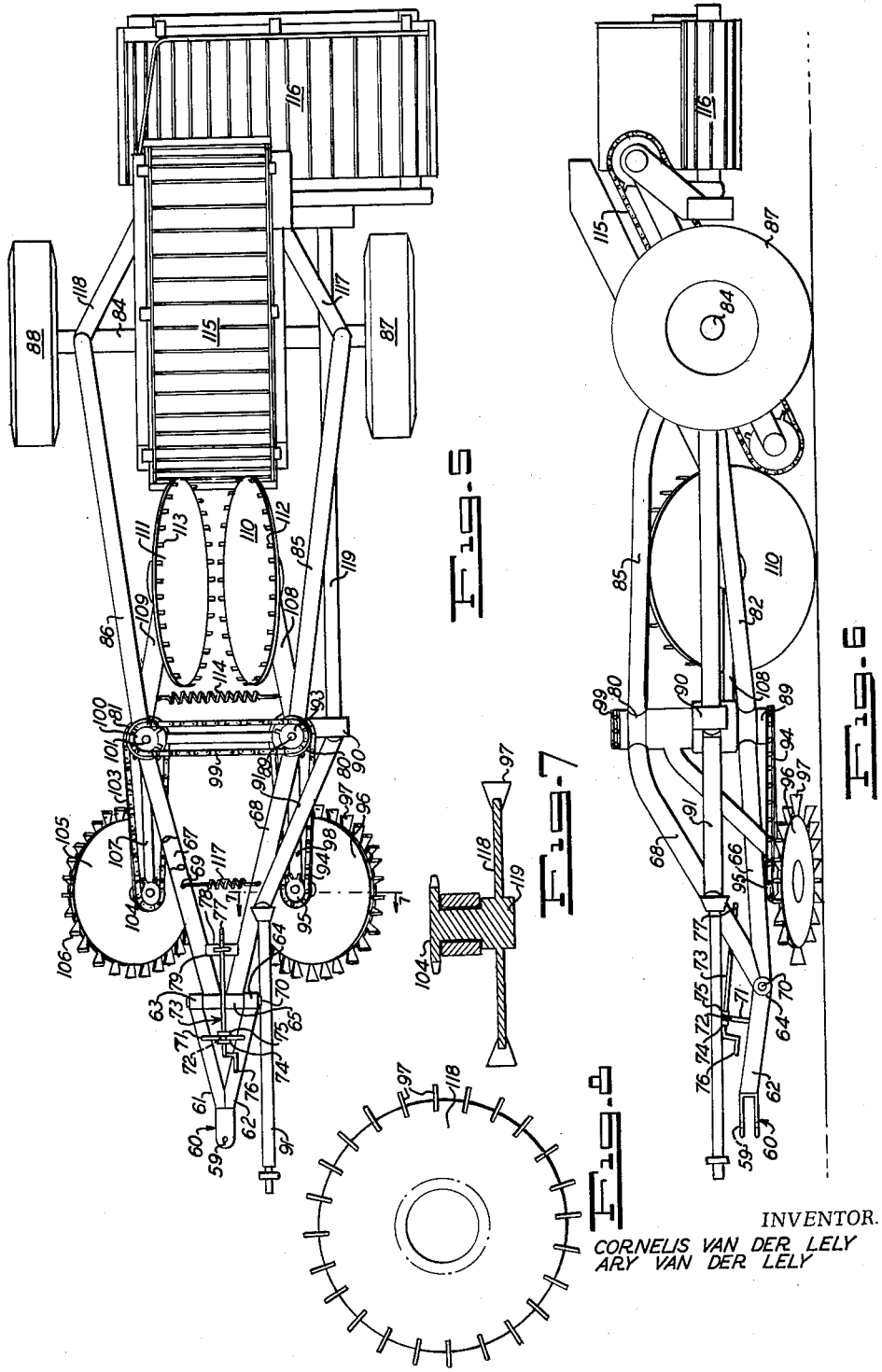

United States Patent Office 2,973,816
Patented Mar. 7, 1961

2,973,816

BEET HARVESTING MACHINES

Cornelis van der Lely and Ary van der Lely, Maasland, Netherlands, assignors to C. van der Lely N.V.

Filed Nov. 5, 1956, Ser. No. 620,452

Claims priority, application Netherlands Nov. 7, 1955

7 Claims. (Cl. 171—58)

This invention relates to a device for harvesting beets or the like root vegetables.

Known machines for harvesting beets are generally provided with two bars extending rearwardly and obliquely upwards from the front of the machine, the bars serving to lift the beets from the ground. However, these machines have the disadvantage that a considerable amount of earth is caught up with and adheres to the beets, which is undesirable, this being due to the fact that hair-like roots exist on the surface of the beet, and are directed away from the latter in all directions. Also, the harvesting of the beets in this way requires a considerable force which has to be furnished by the running wheels of the tractor, which tend to slip very easily on wet ground.

It is an object of the invention to avoid these drawbacks.

According to the invention there is provided a device for harvesting beets or the like root vegetables, wherein a frame adapted to be moved over the ground is provided with means for engaging with a beet and for turning the same through an angle about its longitudinal axis while the beet is in the ground.

The turning of the beet while it is in the ground causes the hair-like roots, by which the beet is anchored in the ground, to be drawn or stripped off. Also the earth which cleaves to the beet itself is removed from the beet by this rotation. After being turned, the beet is loose in the ground and can be lifted up easily. The earth that cleaves to the beets harvested in this way is very small.

It is possible to drive the device from a tractor so that the force to harvest the beets can be furnished by the power take-off of the tractor or by a motor built on the device, whereby the slipping of the power-driven running wheels is not a decisive factor in deciding whether or not the device can be used on wet ground.

The turning of a beet before the same is harvested can occur in different ways. Preferably, the device comprises a movable first member, which is located adjacent to a second member, the first member being arranged to move in a direction, which at the side nearest to the second member is opposite to the intended direction of travel of the device. It is also possible to make the second member a movable member.

It is favourable if the beet does not exert a reaction force on the ground at the moment it is turned. To attain this, the sum of the relative speeds with regard to the device of those points of the members, which are nearest to each other plus twice the travelling speed must be naught. By this means the beet is not pressed to one side, so that the lowermost part of the beet does not break off.

Also, the members are preferably provided with projections, which prevent the members from sliding along the beet.

In order that beets of different size can be worked, it is desirable that at least one of the members is resiliently mounted in such a way that it can give way with regard to the other member in a direction transverse to the travelling direction of the device.

Figure 2:
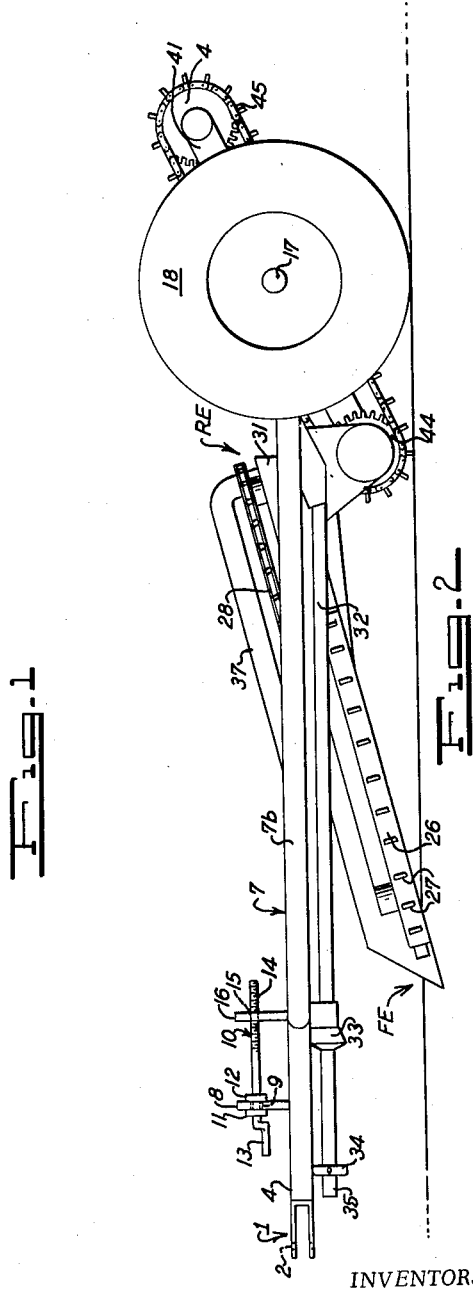

For a better understanding of the invention, and to show how the same may be carried into effect, reference will now be made to the accompanying drawings in which:

Fig. 1 is a plan view of a device for harvesting beets or the like root vegetables, Fig. 2 is a side elevation of the device shown in Fig. 1, Fig. 3 is a plan view of a modification of the device shown in Figs. 1 and 2, Fig. 4 is a side elevation of the device shown in Fig. 3, Fig. 5 is a plan view of a further modification of the device, Fig. 6 is a side elevation of the device shown in Fig. 5, Fig. 7 is a section along the line I—I of Fig. 5 of a detail of the device shown in Figs. 5 and 6, and Fig. 8 is a plan view of the detail shown in Fig. 7.

Referring now to Figures 1 and 2, there is shown a device for harvesting beets or the like root vegetables. The device has a fork 1 for connecting the device to a tractor, there being holes 2 formed in the fork 1 for the reception of a locking pin. The fork 1 is fixedly connected to two beams 3 and 4, which diverge rearwardly (with respect to the intended direction of travel of the device) from the fork 1, and which carry bushes 5 and 6 respectively at their rearmost ends, the bushes 5 and 6 being rotatably mounted on a beam 7a of the mobile frame or support 7 of the device. A plate 8 is provided between the beams 3 and 4, the plate 8 being formed with a hole 9, through which passes a rod 10 having a smaller thickness than the inner diameter of the hole 9. The rod 10 is held in place in the plate 8 by two collars 11 and 12, which are fixedly connected with the rod 10. The rod 10 is formed with a crank 13 at one end and with a screwthread 14 at the other end. The end of the rod 10 formed with the screw-thread 14 passes through a screwthreaded hole 15 formed in a plate 16, which is fixedly mounted to the beam 7a of the frame 7. By rotating the rod 10 by means of its crank 13, the beams 3 and 4 rotate upwardly or downwardly about the beam 7a of the frame 7.

The frame 7 of the device consists of a horizontally disposed U-shaped beam, the legs 7b of which extend rearwardly of the device and are fixedly connected to an axle 17, at the ends of which two running wheels 18 and 19 are rotatably mounted. A crossbeam 20 is located between the legs 7b of the frame 7 and a beam 21 is fixedly connected to the crossbeam 20, the beam 21 extending forwardly from the crossbeam 20, and being directed obliquely downwards. The beam 21 carries two sprocket wheels 22 and 23, which can rotate about axes 24 and 25 respectively. An endless chain 26 passes around the wheels 22 and 23, the chain 26 being provided with projections 27. The wheel 23 is fixedly connected to a sprocket wheel 29 which is driven by a chain 28. The chain 28 passes around a further sprocket wheel 30, whereby rotation of the wheel 30 causes a rotation of the wheels 29, 23 and 22. The wheel 30 is driven from a gear-box 31, which is secured to the crossbeam 20. The gear-box 31 is driven from the tractor through the agency of a driving-shaft 32, which is mounted on the beam 7a, and which is provided with two universal joints 33 and 34, whereby the end 35 of the driving shaft 32 can be connected to the power take-off of the tractor. A beam 37 is pivotally mounted on the crossbeam 20, the beam 37 being mounted about an inclined axis 36. The beam 37 carries a bar 38 provided with teeth or projections 38a and the bar 38 is pivotally connected to the beam 37 about an axis 39, which is parallel to the axis 36. The chain 26 and the bar 38 constitute a pair of opposed and upwardly inclined, substantially coextensive conveyors situated in one plane, which extends obliquely upwards from the front of the bar 38 to the crossbeam 20. These conveyors are arranged such that their front ends FE are lower than their rear ends RE, said front ends being located close to the ground. Two draw-springs 40 are located between the beam 21 and the bar 38 and serve to draw the bar 38 and the beam 28 together. However, there are abutments (not shown) which hold in spaced relation the bar 38 and that part of the chain 26, which is nearest to the bar 38. Two parallel beams 41 and 42, extending obliquely upwards, are mounted on the crossbeam 20 and the axle 17. Two cylinders 43 and 44 are rotatably mounted between the extremities of the beams 41 and 42, there being a conveyor 45 running around such cylinders. The conveyor 45 is driven by means of the cylinder 44 from the gear-box 31.

In the operation of the device, the device is driven as accurately as possible over a row of beets, of which the leaves and the upper parts have previously been cut off, so that the beets become disposed between the chain 26 and the bar 38. The chain 26 has, at the side which is nearest to the bar 38, a movement in the opposite direction to that in which the device is moving, the speed of this part of the chain 26 preferably being twice the travelling speed. When a beet comes between the chain 26 and the bar 38 it is turned, so that it rolls along the bar 38, this movement being increased by the movement of the chain 26. Sprocket wheels 29 and 30 and chain 28 constitute, in effect, a differential driving means inasmuch as they give chain 26 a movement relative to bar 38. A small angular movement of the beet is sufficient to ensure that the beet is harvested without soil adhering to it. The greater is the length of the bar 38, then the more is the best turned. The lateral hair roots of the beet are not able to follow the angular movement of the beet since they are embedded in the ground, and, therefore, they are drawn off from the beet. By selecting the particular speed of the chain 26, the beet is not moved in a transverse direction to its central longitudinal axis, this being so since the circumferential speed, with which the beet is turned, is equal to the travelling speed of the device. In addition to being turned in the ground, the beet is lifted up by virtue of the inclination of the bar 38 and the chain 26. The beet is lifted clear of the ground and is dropped back onto the ground when it reaches the rear ends of the bar 38 and the chain 26. Afterwards, the beet is taken up by the conveyor 45, which cleans the beet further of any earth which might adhere to it, the beet being thereafter deposited on the ground again.

Referring now to Figures 3 and 4, there is shown a modification of the device shown in Figures 1 and 2. This modification is the same as the device shown in Figures 1 and 2, except that the beam 37 and the bar 38 have been replaced by another construction. In this modification, a beam 46 is mounted on the crossbeam 20, so as to be rotatable about an inclined axis 47. The beam 46 carries another beam 48, to which two sprocket wheels 49 and 50 are fixed so as to be rotatable about axes 51 and 52 respectively. The sprocket wheel 50 drives a chain 53 which is provided with projections 54, and is fixedly connected to a sprocket wheel 55, which is driven from a sprocket wheel 57 by means of a chain 56. The sprocket wheel 57 is driven from a gear-box 58, which is mounted on the crossbeam 20, and which is also driven from the driving shaft 32. The chains 26 and 53 are again located in one plane, which extends obliquely upwards from the front ends to the back ends of the chains. The beams 21 and 48 are connected by two draw-springs 40 which tend to pull the beam 48 towards the beam 21, there being, however, abutments (not shown) which ensure that the beams 21 and 48 are maintained in spaced relation to one another. Although not shown in the drawings, it is possible to provide means for maintaining the beams 21 and 48 in their substantially parallel relationship, and it is possible to mount the chain 26 in such a way that it can yield transversely in the same way that the chain 53 can yield transversely by virtue of the fact that the beam 46 is rotatable about the axis 47.

In the operation of the device, the chains 53 and 26 move at different speeds, chains 26 and 56 constituting differential driving means, so that it is possible to turn the beets more slowly with this device than with the device shown in Figures 1 and 2. The direction of movement of the chain 53 at the side of that chain nearest to the chain 26 is also directed so as to be opposite to the direction of travel of the device. The speed of the chain 53, however, must be less than that of the chain 26. In order to ensure that a correct moment without side forces is exerted on the beet, the sum of the speeds of both chains plus twice the travelling speed must be nought, the movements directed opposite to the direction of travel of the device being considered to be negative.

Referring now to Figures 5 to 8, there is shown a further modification of the device, the device having a fork 60 which is formed with two holes 59, for the reception of a locking pin, whereby the device can be pivotally connected to a tractor. The fork 60 is connected to two bars 61 and 62, which have bearings 63 and 64 respectively at their other ends. A tube 65 is disposed between the bearings 63 and 64, and two beams 66 and 67 are connected to the tube 65. The beams 66 and 67 extend rearwardly from the fork 60, and diverge from one another in a substantially horizontal plane so as to lie in V-shaped relation to one another. Two beams 68 and 69 extend obliquely upwards from the tube 65, the beam 68 being located in the same vertical plane as the beam 66 and the beam 69 being located in the same vertical plane as the beam 67. The tube 65 and the bearings 63 and 64 are connected to each other by means of a pin 70. A plate 77 is mounted between the bars 61 and 62 and is formed with a hole 72, through which passes a rod 73. The rod 73 is held in place in the hole 72 by means of two collars 74 and 75. The rod 73 is formed with a crank 76 at one end, and with a screw-thread 77 at the other end. The said other end of the rod 73 passes through a screwthreaded hole 78 formed in a plate 79, which is located between the beams 68 and 69. In this way the bars 61 and 62 can be held in place, but can be rotated upwardly or downwardly about the pin 70, by turning the crank 76 of the bar 73. The extremities of the beams 66 and 68 and the beams 67 and 69 are connected to each other by tubes 80 and 81 respectively. At the lowermost ends of the tubes 80 and 81 two beams 82 and 83 are connected so as to lie substantially in prolongation of the beams 66 and 67 respectively. The beams 82 and 83 extend rearwardly towards an axle 84 on which two running wheels 87 and 88 are mounted, the greater part of the weight of the device being supported by the running wheels 87 and 88. Two beams 85 and 86 are situated respectively above the beams 82 and 83, the beams 85 and 86 being connected to the supper ends of the tubes 80 and 81 and also to the axle 84. An axle 89 is mounted in the tube 80 and is driven from a gear-box 90, which itself is driven directly from the tractor by means of a driving shaft 91. The axle 89 carries sprocket wheels 92 and 93, one at each end thereof. The sprocket wheel 92 drives a sprocket wheel 95 by means of a chain 94. A wheel 96, which is provided with projections 97, and which is fixedly connected to the wheel 95 is also driven by the wheel 92, the wheel 96 being rotatably connected to the tube 80 by means of an arm 98. The wheels 95 and 96 rotate in opposite directions in the same way as is described for the chains 26 and 53 of Figures 3 and 4.

Figures 7 and 8 show the construction of the wheel 96, which comprises a circular disc 118 having a hub 119. Triangular-shaped plates 97 are connected to the disc 118 around its circumference. The plates 97 are situated in planes which are perpendicular to the plane of the disc 118. This has the advantage that the plates 97 at the moment when they contact a beet, are disposed vertically whereby they can engage with the beet in order to turn the same. The wheel 93 drives a sprocket wheel 100 by means of a chain 99, the wheel 100 being fixedly connected to an axle 101, which is mounted through the tube 81 and which carries a sprocket wheel 102 at its lower end. The sprocket wheel 102 drives a wheel 105 by means of a chain 103 and a sprocket wheel 104. The wheel 105 is also provided with projections 106, and furthermore is constructed in the same way as the wheel 96. The wheel 105 is rotatably mounted on the tube 81 by means of an arm 107. A draw-spring 117 is mounted between the arms 98 and 107, and serves to draw the wheels 96 and 105 towards each other, there being abutments (not shown) which ensure that the wheels are maintained at least a minimum distance apart from each other. Two arms 108 and 109 are rotatably connected to the tubes 80 and 81 and each carry a respective wheel 110 or 111. The wheels 110 and 111 are rotatably connected to the arms 108 and 109 respectively, and are rotated with the same speed by coming into contact with the ground. However, it is also possible to drive these wheels from the gearbox 90. The wheels 110 and 111 lie in planes which make a small angle with the vertical plane, and are provided at their circumference with tines 112 and 113 respectively, there being a draw-spring 114, which is situated between the arms 108 and 109 for drawing the wheels 110 and 111 towards each other. Here also means are provided which ensure that the wheels are maintained at least a certain minimum distance apart from each other. Two conveyors 115 and 116 are mounted on the device, the conveyor 115 lying longitudinally of the device, and the conveyor 116 lying transversely of the device, the conveyors 115 and 116 being driven from the tractor by the shaft 91.

The operation of the device shown in Figures 5 to 8 is similar to that of the device shown in Figures 1 and 2 or Figures 3 and 4, and the beets are turned one after another through an angle, in order to remove the roots, by means of the wheels 96 and 105. Afterwards the beets are caught by the wheels 110 and 111, which lift the beets from the ground, as a result of which the conveyor 115 can pick them up. The conveyor 116 is arranged to turn periodically over half its length, so that the beets are dropped in small heaps. It is to be understood that by means of the wheels 110 and 111 the beets can also be turned about their longitudinal axes; in this construction the wheels 110 and 111 are preferably being driven as is described with respect to wheels 95 and 96 of Figures 5 and 6.

What we claim is:

1. A device for harvesting beets and like objects comprising a mobile support, a pair of opposed upwardly inclined, substantially coextensive conveyors on said support, said conveyors having forward and rearward ends, the forward ends being lower than the rearward ends and adapted to be located close to the ground, and differential driving means operatively connected to at least one of said conveyors whereby objects gripped by and between said conveyors will be conveyed upwardly and, at the same time, rotated to separate roots and dirt therefrom.

2. A device as claimed in claim 1 wherein one of said conveyors is a fixed bar and the other of said conveyors is an endless chain.

3. A device as claimed in claim 1 wherein said conveyors are endless members rotatable in opposite rotary directions.

4. A device as claimed in claim 1 comprising spring operatively associated with and urging the conveyors towards each other.

5. A device as claimed in claim 1 wherein said conveyors are controlled by the differential driving means to move relative to each other at a speed twice that of said mobile support on the ground.

6. A device as claimed in claim 1 comprising a conveyor on said support and operatively disposed with respect to the rear ends of the first said conveyors to receive objects therefrom.

7. A device as claimed in claim 1 comprising projections on said conveyors.

References Cited in the file of this patent

UNITED STATES PATENTS

| Re. 23,565 | Waack et al. | Oct. 14, 1952 |
| 1,410,420 | Stedman | Mar. 21, 1922 |

FOREIGN PATENTS

| 1,024,088 | France | Jan. 7, 1953 |